(No Model.) 2 Sheets—Sheet 1.
S. DOUBRAVA & J. DONÁT.
ELECTRIC ARC LAMP.
No. 550,600. Patented Dec. 3, 1895.
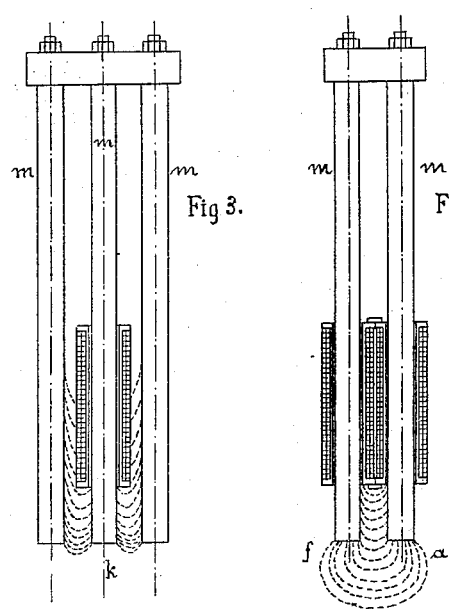

(No Model.) 2 Sheets—Sheet 2.
S. DOUBRAVA & J. DONÁT.
ELECTRIC ARC LAMP.

No. 550,600. Patented Dec. 3, 1895.

UNITED STATES PATENT OFFICE.

STEFAN DOUBRAVA AND JOSEF DONÁT, OF BRÜNN, AUSTRIA-HUNGARY.

ELECTRIC-ARC LAMP.

SPECIFICATION forming part of Letters Patent No. 550,600, dated December 3, 1895.

Application filed February 2, 1895. Serial No. 537,135. (No model.)

*To all whom it may concern:*

Be it known that we, STEFAN DOUBRAVA and JOSEF DONÁT, subjects of the Emperor of Austria-Hungary, and residents of the city of Brünn, Province of Moravia, in the Austro-Hungarian Empire, have invented certain new and useful Improvements in Electric-Arc Lamps and Current-Regulators; and we do hereby declare that the following is a full, clear, and exact description of same.

As is known, a cylindrical iron core is drawn into the interior space of a solenoid, and by changing the cross-section of said iron core the curve of attraction can be modified, as desired. The attractive power obtained in this way is, however, so slight that it is only on operating on a large scale that sufficient sensitiveness can be imparted to the apparatus; and the object of our invention is to remove this difficulty by providing a powerful magnetic system whereby the voltaic arc can be regulated direct by means of a new combination of solenoids, iron cores, and shells or casings so arranged that the carbon-holders are directly and movably connected either with the core or with the solenoid, while the other part of the electromagnet is immovable.

We will explain our invention with reference to the accompanying drawings, in which—

Figure 8:
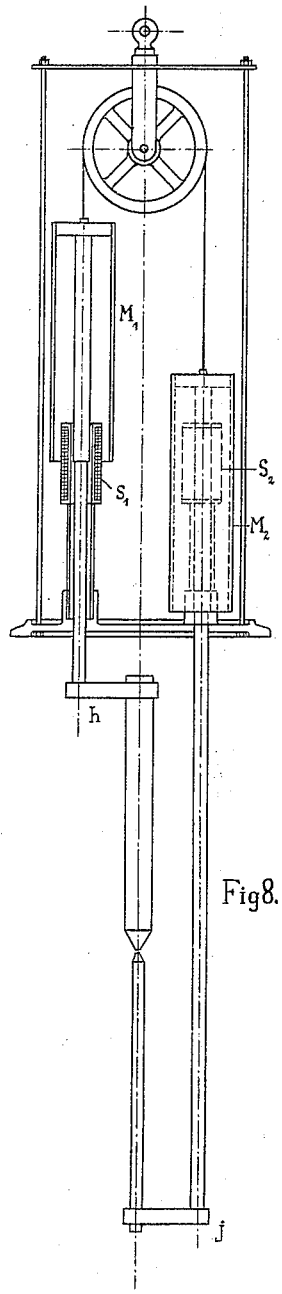
Figure 9:
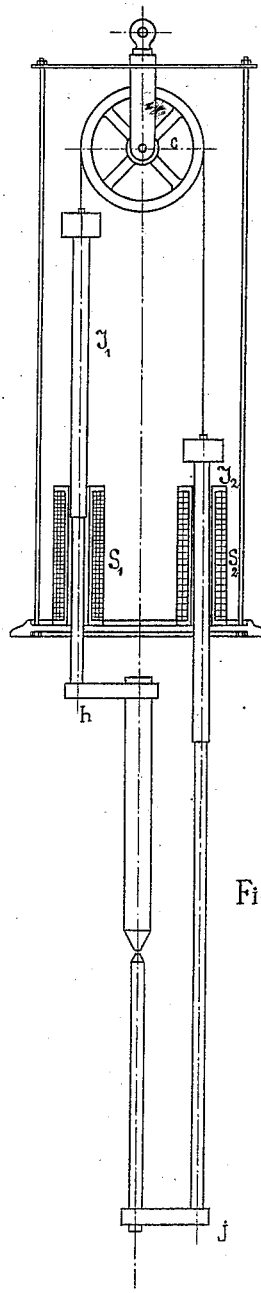
Figure 10:
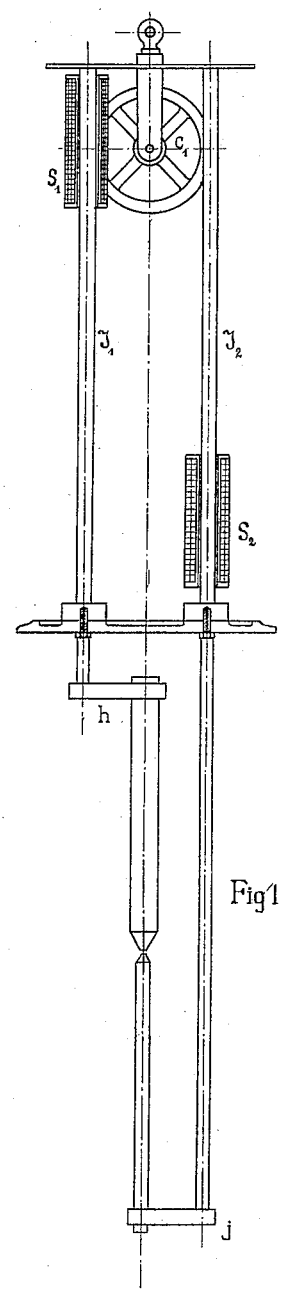

Figure 1 shows an iron core inserted in a solenoid. Figs. 2 and 3 show different ways of arranging the core with magnetic reconductor. Fig. 4 shows the manner of using two solenoids having opposite poles. Figs. 5 and 6 show the manner of combining the cores and solenoids in order to obtain the same effect as in Fig. 4. Fig. 7 represents the shell or casing in Fig. 1 partially cut away. Fig. 8 is a regulator with a mantle-core. Fig. 9 represents a lamp with two yoke-cores. Fig. 10 shows these yoke-cores immovable, while the solenoids are movable.

With reference to Fig. 1, $k$ is an iron core having a thick iron plate $i$ attached to its end, and which when the core is inserted in the solenoid acts as a reconductor. The magnetic lines of force run off above the center plane A B of the solenoid in the iron, while those on the other side of the center plane must traverse the air-space between the mantle and the central core. The effect of this is that the said lines of force are very close together on the surface $a\,b$ of the core, and in consequence have greater repulsive power, which prevents the magnetic core from working into the solenoid. The attraction which a solenoid-core has upon a mantle-core is two to four fold greater than would be the case on a simple or ordinary core of the same length. The curve of this attraction is quite a different one from that of an ordinary core, and it is a characteristic feature of the former curve that the maximum attractive power can be worked on to the end—that is, where the core is inserted up to the plate $i$—and which is effected by partially cutting the mantle at an inclination and by strengthening the face-plate, as is shown in Fig. 7.

With reference to Figs. 2 and 3, the magnetic reconductor is here represented by one or more staves $m\,m$, the tapering of the lines of force and the effect being the same as in Fig. 1. It will be seen from Figs. 2 and 3 that the lines of force $k$ come together thickly at the end inserted in the solenoid, while they are spread all over the surface of the outer side of the core. In order to bring these lines of force thickly together toward the end $f$, and thereby to increase the attractive power of the cores, a second solenoid can be slid onto the outer core part, and which must have opposite poles to the first one. (See Fig. 4.) The same effect can be obtained by combining several cores and solenoids.

With reference to Fig. 8, two mantle-cores $M'$ and $M^2$ are suspended on a coil turning on a small pulley and carry the carbon-holders $h\,i$. These cores pass through the solenoids $S'$ and $S^2$, of which $S'$ lies in the shunt-circuit and $S^2$ in the main circuit. By means of the main-circuit solenoid the carbons are kept apart and by the shunt-circuit solenoid the said carbons are moved toward each other.

In Fig. 9 two systems are used, such as are shown in Fig. 4, and stand vertical to the plane of the drawings, so that only one solenoid can be seen in each system. The yoke-cores are connected underneath by a non-magnetic side rod, and this latter carries at the same time the carbon $k$. Each pair is connected above by a yoke $y$, and both are suspended on the cord.

In Fig. 10 both pairs of yoke-cores $J'$ and $J^2$ are immovable and are connected underneath by a yoke $y$ vertical to the plane of the drawing, and are held above by a non-magnetic plate. The movable pairs of solenoids $S'$ and $S^2$ each carry a carbon-holder of non-magnetic material.

The magnets in Figs. 9 and 10 are the same as in Figs. 4, 5, and 6.

We claim—

1. An arc light comprising the combination of carbon-holders, a regulating solenoid, a core for the same and a mantle for the core, the solenoid being considerably shorter than the core and sliding thereon between its ends and the carbon-holders being directly attached to one of the two elements of the magnetic system.

2. An arc light comprising the combination of carbon-holders, a regulating solenoid, a core for the same and side-rods for the core, the solenoid being considerably shorter than the core and sliding thereon between its ends and the carbon-holders being directly attached to one of the two elements of the magnetic system.

In testimony that we claim the foregoing as our invention we have signed our names in presence of two subscribing witnesses.

STEFAN DOUBRAVA.
JOSEF DONÁT.

Witnesses:
ROBERT BARTELMAY,
JOSEF SENFT.